(12) United States Patent
Kitamura et al.

(10) Patent No.: US 9,127,174 B2
(45) Date of Patent: *Sep. 8, 2015

(54) AQUEOUS COMPOSITION FOR CONDUCTIVE COATING

(75) Inventors: Shinichi Kitamura, Osaka (JP); Yoshinobu Terada, Shiga (JP); Takeshi Takaha, Hyogo (JP); Motohide Ikeda, Osaka (JP); Yoshiyuki Morimoto, Hyogo (JP); Nobuo Kubozaki, Hyogo (JP)

(73) Assignees: Ezaki Glico Co., Ltd., Osaka (JP); Osaka Prefecture University Public Corporation, Osaka (JP)

( * ) Notice: Subject to any disclaimer, the term of this patent is extended or adjusted under 35 U.S.C. 154(b) by 897 days.

This patent is subject to a terminal disclaimer.

(21) Appl. No.: 12/161,365

(22) PCT Filed: Jan. 19, 2007

(86) PCT No.: PCT/JP2007/050842
§ 371 (c)(1),
(2), (4) Date: Sep. 15, 2008

(87) PCT Pub. No.: WO2007/083771
PCT Pub. Date: Jul. 26, 2007

(65) Prior Publication Data
US 2010/0224836 A1 Sep. 9, 2010

(30) Foreign Application Priority Data

Jan. 20, 2006 (JP) .................................. 2006-013020

(51) Int. Cl.
| C01B 31/02 | (2006.01) |
| C09D 5/24 | (2006.01) |
| B82B 1/00 | (2006.01) |
| C08B 1/00 | (2006.01) |
| C08B 37/00 | (2006.01) |
| C08L 3/12 | (2006.01) |
| C08L 5/00 | (2006.01) |
| C09D 7/12 | (2006.01) |
| C08K 3/04 | (2006.01) |

(52) U.S. Cl.
CPC . *C09D 5/24* (2013.01); *C08B 1/003* (2013.01); *C08B 37/0003* (2013.01); *C08B 37/0057* (2013.01); *C08L 3/12* (2013.01); *C08L 5/00* (2013.01); *C09D 7/1291* (2013.01); *C08K 3/04* (2013.01)

(58) Field of Classification Search
CPC .................................. C01B 31/02; C09D 5/24
USPC .......... 252/500–511; 977/734, 742, 753, 786, 977/788
See application file for complete search history.

(56) References Cited

U.S. PATENT DOCUMENTS

| 3,447,940 A * | 6/1969 | Halleck ..................... 106/162.1 |
| 2003/0122111 A1* | 7/2003 | Glatkowski .................. 252/500 |
| 2004/0071949 A1* | 4/2004 | Glatkowski et al. ........ 428/313.3 |
| 2004/0115232 A1* | 6/2004 | Giroud et al. ................. 424/401 |

FOREIGN PATENT DOCUMENTS

| JP | 06-121647 | 5/1994 | |
| JP | 10-237107 | 9/1998 | |
| JP | 2000-038520 | 2/2000 | |
| JP | 2000-157262 | 6/2000 | |
| JP | 2000-287630 | 10/2000 | |
| JP | 2001-048511 | 2/2001 | |
| JP | 2005-014332 | 1/2005 | |
| JP | 2005-281672 | 10/2005 | |
| JP | WO2005108482 A1 * | 11/2005 | ............... C08L 3/00 |
| JP | 2006-063307 | 3/2006 | |
| WO | 02/07869 A1 | 1/2002 | |

OTHER PUBLICATIONS

Takahashi et al. ("Dispersion and purification of single wall carbon nanotubes using carboxycellulose." Jap. Journal of applied phys., 43, 6A, pp. 3636-3639, Jun. 9, 2004).*
Pinto et al. ("Chemical composition and structural features of the macromolecular components of plantation Acacia mangium Wood." J. of Agricultural and Food Chemistry, vol. 53, pp. 7856-7862, Sep. 10, 2008).*
Bandyopadhyaya et al. ("Stabilization of individual carbon nanotubes in aqueous solutions." NanoLetters, vol. 2, No. 1, pp. 25-28, Nov. 22, 2001).*
Minami et al. ("Cellulose derivatives as excellent dispersants fo rsingle-wall carbon nanotubes as demonstrated by absorption and photoluminescence spectroscopy." Apl phys let., vol. 88, 093123, Mar. 2006).*
Roubroeks et al. ("Contribution of the Molecular Architecture of 4-O-Methyl Glucuronoxylan to Its Aggregation Behavior in Solution." Hemicellulose: Science and Technology, Chapter 12, ACS symposium series, p. 167-183, 2003).*
Reis et al. ("Cellulose-Glucuronoxylans and plant cell wall structure." Micron, 25(2), pp. 171-187, 1994).*
Leszek Stobinski et al., Single-walled carbon nanotube-amylopectin complexes, Carbohydrate Polymers, 51(3), p. 311-316, Feb. 15, 2003.
Cheng-yi Lii et al., Single-walled carbon nanotube-potate amylase complex, Carbohydrate Polymers, 51(1), p. 93-98, Jan. 1, 2003.
Alexander Star et al., Starched Carbon nanotubes, Angew. Chem. Int. Ed., 41(14), p. 2508-2512, Jul. 15, 2002.

(Continued)

*Primary Examiner* — Tri V Nguyen
(74) *Attorney, Agent, or Firm* — Renner, Otto, Boisselle & Sklar, LLP

(57) ABSTRACT

Objective is to provide an aqueous composition for conductive coating which enables to form a conductive coating. In more specific embodiment, an object of the present invention is to provide an aqueous composition for conductive coating which enables to form a conductive and transparent coating, while being excellent in environmental safety and dispersion stability. An aqueous composition for conductive coating, comprising a water-soluble xylan, a resin and a carbon nanotube in an aqueous medium. The carbon nanotube may be a multilayer carbon nanotube or a single-layer carbon nanotube.

16 Claims, 2 Drawing Sheets

(56) References Cited

OTHER PUBLICATIONS

International Search Report for corresponding Application No. PCT/JP2007/050842 dated Feb. 27, 2007.
Form PCT/ISA/237.
Ebringerova et al., "Structure and Properties of Water-Soluble p-Carboxybenzyl Polysaccharide Derivatives", Journal of Applied Polymer Science, vol. 78, 2000, pp. 1191-1199.
Kayserilioglu et al., "Use of xylan, an agricultural by-product, in wheat gluten based biodegradable films: mechanical, solubility and water vapor transfer rate properties", Elsevier Bioresource Technology 87, 2003, pp. 239-246.
Ebringerova et al., "Water-Soluble p-carboxybenzylated beechwood 4-O-methylglucuronoxylan: structural features and properties", Carbohydrate Polymers 42, 2000, pp. 123-131.
Maeda, Regioselectivity and stereochemistry of the synthesized sulfated polysaccharides, CACS Forum vol. 18, (Dec. 1998), p. 33-39.
Office Action dated Sep. 20, 2011 issued in the related U.S. Appl. No. 12/161,371.
Final Office Action dated Feb. 13, 2012 issued in the related U.S. Appl. No. 12/161,371.
Office Action dated Jun. 13, 2013 issued in the related U.S. Appl. No. 12/161,371.
Final Office Action dated Nov. 15, 2013 issued in the related U.S. Appl. No. 12/161,371.
Office Action dated Mar. 25, 2014 issued in the related U.S. Appl. No. 12/161,371.
Final Office Action dated Aug. 6, 2014 issued in the related U.S. Appl. No. 12/161,371.
Saha, "Hemicellulose Bioconversion", Journal of Industrial Microbiology & Biotechnology, 2003, vol. 30, pp. 279-291.
Ebrignerova et al., "Chemical Modification of Beechwood Xylan with p-Carboxybenzyl Bromide", Journal of Applied Polymer Sciences, 1996, vol. 62, pp. 1043-1047.

\* cited by examiner

AQUEOUS COMPOSITION FOR CONDUCTIVE COATING

TECHNICAL FIELD

The present invention relates to an aqueous composition for conductive coating.

BACKGROUND ART

Conductive coating materials are used to obtain a conductive coating (also referred to as conductive films herein). Most conventional conductive coating materials are those that use a colored conductive pigment (mainly black). Because the conductivity of such conductive pigments conventionally used is low, the amount of the conductive pigment added is required to be increased for improvement of the conductivity of coating. Because of the deep color of the conductive pigment, if added in high amount, the resultant coating material itself will be deeply colored and not transparent. For this reason, it was considered difficult to produce a coating higher in the conductivity and also transparency.

As for a coating material to obtain a highly transparent conductive coating, a coating material using indium oxide is known. However, the coating material using indium oxide has problems in that the indium oxide is expensive and that there is limitation in the amount of the indium oxide resource.

Thus, an electromagnetic shielding body is reported which is characterized in that a transparent conductive layer containing ultra-fine conductive fibers is formed on at least one side of a substrate, the ultra-fine conductive fibers are dispersed while in contact with each other without aggregation and the conductive layer has a surface resistivity of $10^5 \Omega/\square$ or less (Patent Document 1). However, a coating liquid for forming the conductive layer prepared by dispersing ultra-fine conductive fibers in a solution of a binder and dissolved in a volatile organic solvent, has a problem related to a volatile organic compound (hereinafter, referred to as "VOC" herein) from the viewpoint of environmental safety.

In order to solve the environmental safety problems, water is the most suitable solvent that can be used to reduce VOCs. Thus, we added a resin for aqueous coating material, as a binder, to a system in which water is used as solvent and a carbon nanotube is dispersed. As a result, significant aggregation occurred. Such a coating liquid with the occurrence of significant aggregation cannot be used for formation of coating.

Patent Document 1: Japanese Laid-open Patent Publication No. 2004-253796 (pp. 1 to 13)

DISCLOSURE OF THE INVENTION

Problems to be Solved by the Invention

This invention was made under the above-mentioned circumstances. That is, the object of the present invention is to provide an aqueous composition for conductive coating which enables the formation of a conductive coating. In more specific embodiment, an object of the present invention is to provide an aqueous composition for conductive coating which enables the formation of a conductive and transparent coating while being excellent in environmental safety and dispersion stability.

Means to Solve the Problems

The present inventors conducted intensive studies in order to solve the aforementioned problems, and, as a result, finally found that it is possible to stably contain carbon nanotubes in an aqueous medium by using a water-soluble xylan, which resulted in completion of the present invention.

The present invention relates to an aqueous composition for conductive coating, comprising a water-soluble xylan, a resin and a carbon nanotube in an aqueous medium.

To achieve the objectives above, the present invention provides, for example, the following means:

Item 1.
An aqueous composition for conductive coating, comprising a water-soluble xylan, a resin and a carbon nanotube in an aqueous medium.

Item 2.
The aqueous composition according to Item 1, wherein said carbon nanotube is a multilayer carbon nanotube.

Item 3.
The aqueous composition according to Item 1, wherein said carbon nanotube is a single-layer carbon nanotube.

Item 4.
The aqueous composition according to Item 1, wherein the number-average degree of polymerization of the main chain of said water-soluble xylan is 6 or more and 5,000 or less.

Item 5.
The aqueous composition according to Item 1, wherein said water-soluble xylan consists of:
a xylose residue or acetylated xylose residue;
an arabinose residue; and
a 4-O-methyl glucuronic acid residue.

Item 6.
The aqueous composition according to Item 5, wherein in said water-soluble xylan, the ratio of the total of the xylose residues and acetylated xylose residues per the arabinose residue is 20 to 100.

Item 7.
The aqueous composition according to Item 1, wherein said water-soluble xylan consists of:
a xylose residue or acetylated xylose residue; and
a 4-O-methyl glucuronic acid residue.

Item 8.
The aqueous composition according to Item 7, wherein in said water-soluble xylan, the ratio of the total of the xylose residues and acetylated xylose residues per the 4-O-methyl glucuronic acid residue is 1 to 20.

Item 9.
The aqueous composition according to Item 1, wherein the number-average molecular weight of said water-soluble xylan is 7,000 or more and 1,000,000 or less.

Item 10.
The aqueous composition according to Item 1, wherein said water-soluble xylan is derived from woody plants.

Item 11.
The aqueous composition according to Item 8, wherein said water-soluble xylan is derived from broad-leaved trees.

Item 12.
The aqueous composition according to Item 1, wherein said aqueous medium is water.

Item 13.
The aqueous composition according to Item 11, wherein the concentration of the carbon nanotube is 50 mg/L or more.

Item 14.
The aqueous composition according to Item 11, wherein the concentration of the carbon nanotube is 1 g/L or more.

Effect of the Invention

In the aqueous composition for conductive coating according to the present invention, a water-soluble xylan is used as a dispersant for carbon nanotubes. Thus, in production of an aqueous carbon nanotube solution for preparation of the aqueous composition, it is possible to shorten the time taken for dispersion, compared to production of an aqueous dispersion by using a conventional dispersant, and there is no aggregation generated during preparation of the aqueous composition for coating from the aqueous solution. It is noted that the expression "dispersant" as used herein refers not only to substances having a dispersing action, but also to substances having a dissolving action. The water-soluble xylan is used as a dispersant, but it has actions not only to "disperse", but also to "dissolve" the carbon nanotube.

In the aqueous composition for conductive coating according to the present invention, the carbon nanotube may be contained at a higher concentration. It is possible to form a coating that is excellent in transparency and conductivity, by coating the aqueous composition for conductive coating according to the present invention without dilution or diluted at any ratio.

The aqueous composition for conductive coating according to the present invention contains none or a very small content of organic solvent. Thus, it has advantages in that it is less odorous, has a higher flash point, and therefore, in a preferable formulation, is capable to provide a coating material does not fall under the category of the hazardous materials specified by the Fire Defense Law.

BEST MODE FOR CARRYING OUT THE INVENTION

Figure 1A:
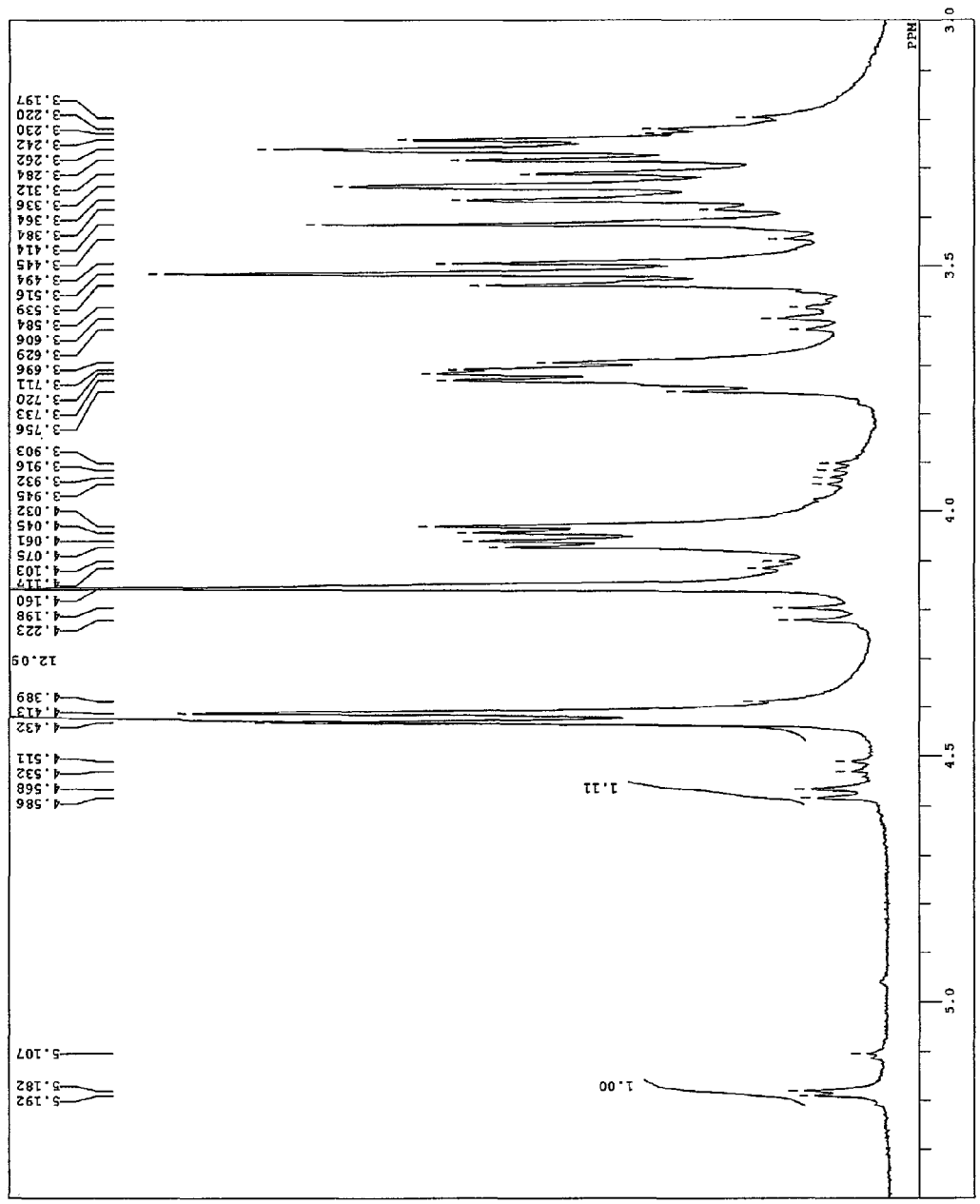
FIG. 1A is a spectral data showing the results of $^1$H-NMR analysis of a water-soluble xylan obtained in Preparative Example 1. The measurement condition for FIG. 1A was as follows: Analyzer: JNM-AL400 manufactured by JOEL Ltd.; measurement frequency, 400 MHz; measurement temperature, 80° C.; and solvent, $D_2O$.

Hereinafter, the present invention will be described in detail.

(1. Aqueous Composition for Conductive Coating)

The aqueous composition for conductive coating according to the present invention (hereinafter, referred to simply as "aqueous composition") is an aqueous composition for forming a conductive coating. The aqueous composition according to the present invention is preferably an aqueous composition for forming a transparent conductive coating (also referred to as conductive transparent film). Herein, the terms coating, coating-film, film, film layer and coating film are synonymous. Herein, the term "coating" is a solid film layer bonding on and continuously covering the surface of an article.

The aqueous composition according to the present invention is preferably a coating material. Herein, the term "coating material" is a kind of material used for surface protection, for changing of appearance and shape of an article, and the like, and that becomes a thin film when spread over the surface of an article in the flow state and then becomes a solid film bonding on and continuously covering the surface over time. The operation of spreading the coating material on the surface of an article is called applying; the process of a solid film being formed is called drying; and the solid film layer is called a coating film. The fluid states include liquid, melted, and air-suspended states, and other states.

The aqueous composition for conductive coating according to the present invention contains a water-soluble xylan, a resin and a carbon nanotube in an aqueous medium.

The content of the water-soluble xylan in the aqueous composition is not particularly limited so long as the object of the present invention is achieved. The content of the water-soluble xylan in the aqueous composition is preferably about 0.05% by weight or more, more preferably about 0.10 by weight or more, and most preferably about 0.2% by weight or more. The content of the water-soluble xylan in the aqueous composition is preferably about 5% by weight or less, more preferably about 2% by weight or less, still more preferably about 1.5% by weight or less, and most preferably about 0.8% by weight or less.

In a particular embodiment, from the viewpoint of further improvement of the dispersion stability during preparation of the aqueous composition and the conductivity of the coating, the content of the water-soluble xylan in the aqueous composition is preferably about 10 parts by weight or more, more preferably about 30 parts by weight or more, and most preferably about 50 parts by weight or more, with respect to 100 parts by weight of the carbon nanotube. From the viewpoint of further improvement of the dispersion stability during preparation of the aqueous composition and the conductivity of the coating, the content of the water-soluble xylan in the aqueous composition is preferably about 400 parts by weight or less, more preferably about 200 parts by weight or less, still more preferably about 150 parts by weight or less, and most preferably about 100 parts by weight or less, with respect to 100 parts by weight of the carbon nanotube.

In a yet particular embodiment, the content of the water-soluble xylan in the aqueous composition is preferably about 2 parts by weight or more, with respect to 100 parts by weight of the resin. The content of the water-soluble xylan in the aqueous composition is more preferably about 6 parts by weight or more, and most preferably about 7.5 parts by weight or more. The content of the water-soluble xylan in the aqueous composition is preferably about 50 parts by weight or less with respect to 100 parts by weight of the resin. The content of the water-soluble xylan in the aqueous composition is more preferably about 40 parts by weight or less and most preferably about 30 parts by weight or less.

When a water-soluble xylan and other dispersants are used in combination, the total amount thereof is preferably in the range as stated above.

The content of the resin in the aqueous composition is not particularly limited so long as the object of the present invention is achieved. The content of the resin in the aqueous composition is preferably about 1.0% by weight or more, more preferably about 2.0% by weight or more, still more preferably about 4.0% by weight or more, and most preferably about 6.0% by weight or more. The content of the resin in the aqueous composition is preferably about 50% by weight or less, more preferably about 30% by weight or less, still more preferably about 20% by weight or less, and most preferably about 15% by weight or less.

In the particular embodiment, the content of the resin in the aqueous composition is preferably about 200 parts by weight or more with respect to 100 parts by weight of the carbon nanotube. From the viewpoint of improvement in strength and further improvement in conductivity of the coating, the content of the resin in the aqueous composition is more preferably about 300 parts by weight or more and most preferably about 400 parts by weight or more. The content of the resin in the aqueous composition is preferably about 3,000 parts by weight or less with respect to 100 parts by weight of the carbon nanotube. From the viewpoint of improvement in strength and further improvement in conductivity of the coating, the content of the resin in the aqueous composition is more preferably about 1,500 parts by weight or less and most preferably about 11,000 parts by weight or less. The aforementioned resin contents refers to the content of the resin itself, and thus, the resin solid content may be in the aforementioned range for the resin which is used in any forms.

The content of the carbon nanotube in the aqueous composition is not particularly limited so long as the object of the present invention is achieved. The content of the carbon nanotube in the aqueous composition is preferably about 0.05% by weight or more, more preferably about 0.1% by weight or more, still more preferably about 0.2% by weight or more, still more preferably about 0.3% by weight or more, and most preferably about 0.4% by weight or more, with respect to the total amount of the aqueous composition. There is no particular upper limit to the content of the carbon nanotube in the aqueous composition, but the content may be, for example, about 10.0% by weight or less, about 7.0% by weight or less, about 5.0% by weight or less, about 4.0% by weight or less, about 3.0% by weight or less, about 2.0% by weight or less, about 1.0% by weight or less, or the like.

In a particular embodiment, the content of the carbon nanotube in the aqueous composition is preferably about 5 parts by weight or more, with respect to 100 parts by weight of the resin. The content of the carbon nanotube in the aqueous composition is more preferably about 6 parts by weight or more and most preferably about 10 parts by weight or more. The content of the carbon nanotube in the aqueous composition is preferably about 50 parts by weight or less with respect to 100 parts by weight of the resin. The content of the carbon nanotube in the aqueous composition is more preferably about 40 parts by weight or less and most preferably about 30 parts by weight or less.

The amount of the medium in the aqueous composition is not particularly limited so long as the object of the present invention is achieved. There is no particular lower limit to the amount of the medium in the aqueous composition, but the amount may be for example, about 20% by weight or more, about 30% by weight or more, about 40% by weight or more, about 50% by weight or more, about 60% by weight or more, about 70% by weight or more, about 80% by weight or more, about 85% by weight or more, about 90% by weight or more, or the like with respect to the total amount of the aqueous composition. The amount of the medium in the aqueous composition is preferably about 99.5% by weight or less, more preferably about 99% by weight or less, still more preferably about 98.5% by weight or less, still more preferably about 98% by weight or less, most preferably about 95% by weight or less, or the like, with respect to the total amount of the aqueous composition. There is no particular upper limit to the amount of the medium in the aqueous composition, but the amount may be, for example, about 95% by weight or less, about 90% by weight or less, about 85% by weight or less, about 80% by weight or less, about 70% by weight or less, about 60% by weight or less, about 50% by weight or less, or the like, with respect to the total amount of the aqueous composition.

The solid content in the aqueous composition is not particularly limited so long as the object of the present invention is achieved. The solid content in the aqueous composition is preferably about 0.5% by weight or more, more preferably about 1.0% by weight or more, still more preferably about 1.5% by weight or more, still more preferably about 2.0% by weight or more, still more preferably about 2.5% by weight or more, and most preferably about 3.0% by weight or more, with respect to the total amount of the aqueous composition. The solid content in the aqueous composition may be about 5% by weight or more, about 10% by weight or more, about 15% by weight or more, about 20% by weight or more, about 30% by weight or more, about 40% by weight or more, about 50% by weight or more, or the like, with respect to the total amount of the aqueous composition. There is no particular upper limit to the solid content in the aqueous composition, but the content may be, for example, about 80% by weight or less, about 70% by weight or less, about 60% by weight or less, about 50% by weight or less, about 30% by weight or less, about 20% by weight or less, about 15% by weight or less, about 10% by weight or less or the like.

(2. Water-soluble Xylan)

The term "xylan", as used herein, refers to a molecule having 2 or more xylose residues that are connected to each other by β-1,4 bonds. Herein, in addition to molecules consisting of xylose residues only (i.e., pure xylose polymer), the modified molecules thereof, and molecules in which other residues such as arabinose are bound to pure xylose polymers are also referred to as "xylan". The pure xylose polymers having a degree of polymerization of up to 5 are soluble in water at a concentration of 6 mg/mL or more. However, the solubility in water of pure xylose polymers having a degree of polymerization of 6 or more is less than 6 mg/mL. It is noted that the solubility, as used herein, is solubility as measured at 20° C.

The term "water-soluble xylan", as used herein, refers to a molecule having six or more xylose residues that are connected to each other with β-1,4 bonds and being capable to dissolve in water at 20° C. in 6 mg/mL or more. The water-soluble xylan is not pure xylose polymer, but is a molecule in which at least part of hydroxyl groups of the xylose polymer are substituted with other substituents (e.g., acetyl group, glucuronic acid residue, arabinose residue, or the like). When a hydroxyl group of the xylan consisting of xylose residues only is substituted with other substituents, the resultant molecule may have higher water solubility than those of xylans consisting of xylose residues only. The molecule in which a hydroxyl group of the xylan consisting of xylose residues only are substituted with other substituent can be referred to as a molecule in which substituent is bound to a xylose polymer, or a modified xylose polymer. It is noted that the term "modified", as used herein, refers to a molecule modified from a reference molecule, and includes not only artificially produced molecules but also naturally occurring molecules. Molecules in which 4-O-methyl glucuronic acid residues and acetyl groups are bound to xylose polymers are generally called glucuronoxylans. Molecules in which arabinose residues and 4-O-methyl glucuronic acids are bound to xylose polymers are generally called arabinoglucuronoxylans.

The water-soluble xylan preferably comprises only xylose residues or the modification thereof in the main chain, and more preferably only xylose residues or acetylatedxylose residues in the main chain. The term "main chain", as used herein, refers to the longest chain in which residues are connected to each other by β-1,4 bonds. When the water-soluble xylan is linear, the molecule itself is the main chain. When the water-soluble xylan is branched, the longest chain connected by β-1,4 bonds is the main chain. The number-average degree of polymerization of the main chain of the water-soluble xylan for use in the present invention is preferably about 6 or more, more preferably about 7 or more, more preferably about 8 or more, particularly preferably about 9 or more, and most preferably about 10 or more. The number-average degree of polymerization of the main chain of the water-soluble xylan for use in the present invention is preferably about 5,000 or less, more preferably about 1,000 or less, more preferably about 500 or less, particularly preferably about 100 or less, and most preferably about 50 or less. The water-soluble xylan having too high number-average degree of polymerization of the main chain may have too low water-solubility.

A hydrophilic group may be bound to any of the position 1, 2, 3 or 4 of the xylose residue. The hydrophilic groups may be bound to all of the four positions of one xylose residue, preferably to three or less positions, more preferably to two or less positions, and most preferably to a single position. The hydrophilic groups may be bound to all xylose residues in the xylose polymer, preferably only to a part of the xylose residues. The ratio of number of the bond of the hydrophilic group is preferably one or more per ten xylose residues, more preferably two or more per ten xylose residues, more preferably three or more per ten xylose residues, particularly preferably four or more per ten xylose residues, and most preferably five or more per ten xylose residues. Examples of the hydrophilic groups include an acetyl group, a 4-O-methyl-α-D-glucuronic acid residue, an L-arabinofuranose residue and an α-D-glucuronic acid residue.

In a particular embodiment of the present invention, a water-soluble xylan in which another saccharide residue is bound to the position 2 of the xylose residue is preferable. As for the ratio of the total of xylose residues and acetylated xylose residues to other saccharide residues in this water-soluble xylan, the total amount of xylose residues and acetylated xylose residues is preferably 20 moles or less, more preferably 10 moles or less, and still more preferably 6 moles or less, with respect to 1 moles of other saccharide residues. As for the ratio of the total of xylose residues and acetylated xylose residues to other saccharide residues, the total amount of the xylose residues and acetylated xylose residues is preferably 1 mole or more, more preferably 2 moles or more, and still more preferably 5 moles or more, with respect to 1 mole of the other saccharide residues.

In a particular embodiment of the present invention, a water-soluble xylan in which α-1,2-bound 4-O-methyl-α-D-glucuronic acid residues is bound to the position 2 of the xylose residues is preferable. As for the ratio of the total of xylose residues and acetylated xylose residues to 4-O-methyl-α-D-glucuronic acid residues in the water-soluble xylan, the total amount of xylose residues and acetylated xylose residues is preferably 100 moles or less, more preferably 50 moles or less, and still more preferably 20 moles or less, with respect to 1 mole of the 4-O-methyl-α-D-glucuronic acid residues. As for the ratio of the total of xylose residues and acetylatedxylose residues to 4-O-methyl-α-D-glucuronic acid residues, the total amount of the xylose residues and acetylated xylose residues is preferably 1 mole or more, more preferably 5 moles or more, still more preferably 9 moles or more, still more preferably 10 moles or more, and still more preferably 14 moles or more, with respect to 1 mole of the 4-O-methyl-α-D-glucuronic acid residues.

The number-average molecular weight of the water-soluble xylan is preferably about 1,000,000 or less, more preferably about 500,000 or less, still more preferably about 100,000 or less, particularly preferably about 50,000 or less, and most preferably about 20,000 or less. The number-average molecular weight of the water-soluble xylan is preferably about 1,500 or more, more preferably about 2,000 or more, still more preferably about 4,000 or more, particularly preferably about 5,000 or more, further more preferably about 6,000 or more, and most preferably about 10,000 or more.

The water-soluble xylan preferably used in the present invention is preferably derived from woody plants. Water-soluble xylans are contained in a plant cell wall part at large amounts. In particular, woods contain large amounts of water-soluble xylans. The structure of the water-soluble xylan varies depending on the kind of the plant from which it is derived. The main component for a hemicellulose contained in broad-leaved woods is known to be glucuronoxylan. The glucuronoxylan contained in broad-leaved woods is often composed of xylose residues, 4-O-methyl glucuronic acids and acetyl groups at a ratio of 10:1:6. It is known that the main component for a hemicellulose contained in needle-leaved woods is glucomannan, and that the needle-leaved woods also contain glucuronoxylan and arabinoglucuronoxylan. It is noted that main chain of glucomannan comprised of mannose and glucose residues, and the ratio of mannose residue to glucose residue is generally 3-4 to 1. The water-soluble xylan for use in the present invention is preferably derived from a broad-leaved wood, more preferably from Siebold's beech, birch, aspen, elm, beech or oak, and is still preferably glucuronoxylan. The hemicellulose component of broad-leaved woods contains the water-soluble xylan for use in the present invention in large amounts. The broad-leaved wood-derived water-soluble xylan is particularly favorable because it contains almost no arabinose residue. As a matter of fact, naturally occurring water-soluble xylan is a mixture of various molecules different in molecular weight. The naturally occurring water-soluble xylan, as long as it exert its advantageous effect, may be used in the state containing contaminants, can be used as a collection of molecules having a broad molecular weight distribution, or used after highly purified as a collection having a narrower molecular weight distribution.

The water-soluble xylan is also contained in needle-leaved woods, herbaceous plants of Gramineae such as corn, rice and wheat, and the like, although in small amounts. In water-soluble xylans derived from these plants, other than 4-O-methyl-α-D-glucuronic acid residues, α-L-arabinose residues are covalently bound to the xylose residues. If the α-L-arabinose residue content is too high, the effect as a dispersant may not be obtained, and thus, xylan having a high α-L-arabinose residue content is not preferable for the object of the present invention. Hemicelluloses extracted from cereals (wheat and rice) and *Sasa veitchii* are arabinoglucuronoxylans mainly comprised of xylose, 4-O-methyl glucuronic acid and arabinose, and are thus, different from the water-soluble xylan according to the present invention as the content of arabinose is high. Even if the water-soluble xylans is derived from herbaceous plant, it can also be used in the present invention by removing at least a part of the L-arabinose residues of it. The L-arabinose residues can be removed by any known methods such as a chemical or enzymatic method.

In a particular embodiment of the present invention, the water-soluble xylan preferably consists of xylose residues or acetylated xylose residues; arabinose residues; and 4-O-methyl glucuronic acid residues. In this embodiment, the total of the xylose residues and acetylated xylose residues is preferably about 7 or more, more preferably about 10 or more, and still more preferably about 20 or more, with respect to one L-arabinose residue in the water-soluble xylan. In this embodiment, the total of xylose residues and acetylated xylose residues is preferably about 100 or less, more preferably about 60 or less, and still more preferably about 40 or less, with respect to one L-arabinose residue in the water-soluble xylan.

The water-soluble xylan is purified, for example, from woods by a known method. The purification methods for water-soluble xylan include, for example, a method which extracts delignified wood as a raw material with about 10% potassium hydroxide solution. The water-soluble xylan may also be obtained by dispersing powdery cellulose produced from woods in water, filtering the solution sequentially through filter paper, 0.45 μm filter, and 0.2 μm filter, and then drying the resulting filtrate.

As for the ratio of the xylose residue to the L-arabinose residue in the water-soluble xylan for use in the present invention, the ratio of the xylose residue is preferably 7 moles or more, more preferably 10 moles or more, and still more preferably 20 moles or more, with respect to 1 mole of the L-arabinose residue. There is no particular upper limit to the ratio of the xylose residues to 1 mole of the L-arabinose residue, and the ratio of the xylose residue is, for example, 100 residues or less, 60 residues or less, 40 residues or less, or the like with respect to 1 mole of the L-arabinose residue.

In a particularly preferable embodiment of the present invention, the water-soluble xylan preferably contains no L-arabinose residue. This water-soluble xylan consists of xylose residues or acetylated xylose residues and 4-O-methyl glucuronic acid residues. In this embodiment, the total ratio of the xylose residues and acetylated xylose residues is preferably about 1 or more, more preferably about 5 or more, more preferably about 9 or more, more preferably about 10 or more, and still more preferably about 14 or more, with respect to one 4-O-methyl glucuronic acid residues in the water-soluble xylan. In this embodiment, the total of the xylose residues and acetylated xylose residues is preferably about 100 or less, more preferably about 50 or less, and more preferably about 20 or less, with respect to one 4-O-methyl glucuronic acid residue in the water-soluble xylan.

(3. Resin)

The resin for use in the present invention may be any resin commonly used in aqueous coating materials. The resin may also be called a binder resin, because it binds carbon nanotubes. The resin may be water-soluble or water-insoluble. Any resin which can dissolve or disperse in aqueous medium may be used. Resins which can dissolve or disperse in aqueous medium are also called aqueous resins. In a particular embodiment, the resin is preferably a water-soluble resin. The resin for use in the present invention may be a natural resin or a synthetic resin.

Examples of the resins for use in the present invention include urethane type resins, acrylic type resins, acrylic silicone type resins, polyolefin type resins, polyester type resins and the like.

The resin may be selected appropriately according to the requirements in properties (e.g., adhesiveness to surface of article to be coated). For example, when polyethylene terephthalate (PET) is used for the surface of the article to be coated, use of a urethane or polyester resin as the resin is preferable from the viewpoint of adhesiveness. For example when acrylic is used for the surface of the article to be coated, use of an acrylic type resin as the resin is preferable from the viewpoint of adhesiveness. It is easily for those skilled in the art to appropriately select the resin in the aqueous composition based on the surface material of the article to be coated.

As long as in the range where the present invention can be achieved, a single kind of resin may be used alone or two or more kinds of resins can be mixed.

Depending on the application for which the coating material of the invention is used, the resin may be colored or colorless, and also may be transparent or opaque, when it forms a coating film. Of course, the degree of coloring and the transparency of the coating film varies according to its thickness. In the case of a coating material for forming a transparent coating film, a resin giving a total light transmittance of about 50% or more, as determined with a coating film having a thickness of about 400 nm formed from it alone, is preferable; a resin giving a total light transmittance of about 60% or more is more preferable; a resin giving a total light transmittance of about 70% or more is more preferable; a resin giving a total light transmittance of about 80% or more is more preferable; a resin giving a total light transmittance of about 90% or more is more preferable; and a resin giving a total light transmittance of about 95% or more is more preferable.

Resins suitable for use in the present invention are usually available as commercial available products. In the present invention, products sold in a state that these resins are dispersed in a medium, such as water, may be used.

Dispersion liquids of urethane type resin are available, for example, as Hydran HW171 (manufacture by Dainippon Ink and Chemicals, Incorporated), Hydran AP-40N (manufacture by Dainippon Ink and Chemicals, Incorporated) and the like.

Dispersion liquids of acrylic type resin are available, for example, as Boncoat HY364 (manufacture by Dainippon Ink and Chemicals, Incorporated), NeoCryl XK-12 (manufacture by DSM), and the like.

Dispersion liquids of acrylic silicone type resin are available, for example, as KANEBINOL KD4 (manufacture by Nippon NSC Ltd.) and the like.

Dispersion liquids of polyester type resin are available, for example, as Vilonal MD1245 (manufacture by Toyobo Co., Ltd.) and the like.

Polyolefin type resins are available under various trade names. From the viewpoint of environmental safety, unchlorinated polyolefin type resins are preferable among the polyolefin type resins. Herein, polyolefin type resins that are not chlorinated will be referred to as unchlorinated polyolefin type resins. Dispersion liquids of unchlorinated polyolefin type resin are available, for example, as Arrowbase SB1010 (manufacture by Unitika Ltd.) and the like.

(4. Carbon Nanotube)

A carbon nanotube (hereinafter, also referred to as CNT) refers to a carbon allotrope in which a plurality of carbon atoms are bound to each other in the cylindrical shape. Any carbon nanotube may be used as the carbon nanotube. Examples of the carbon nanotubes include single-layer carbon nanotubes and multilayer carbon nanotubes, and the coiled derivatives thereof. The single-layer carbon nanotube is a carbon nanotube in which graphite-formed carbon atoms are arranged in a single layer, while the multilayer carbon nanotube is a carbon nanotube in which graphite-formed carbon atoms are arranged in two or more concentric layers. The carbon nanotube for use in the present invention may be a multilayer or single-layer carbon nanotube, but a single-layer carbon nanotube is more preferable. A carbon nanohorn in the form of a carbon nanotube that is closed at one end, a cup-shaped nanocarbon substance having an opening at the head, or a carbon nanotube having openings at both ends may also be used.

The carbon nanotube may be those having any diameter (i.e., external diameter). The diameter of the carbon nanotube is preferably about 0.4 nm or more, more preferably about 0.5 nm or more, more preferably about 0.6 nm or more, more preferably about 1.0 nm or more, and most preferably about 1.2 nm or more. The diameter of the carbon nanotube is preferably about 100 nm or less, more preferably about 60 nm or less, still more preferably about 50 nm or less, still more preferably about 40 nm or less, still more preferably about 30 nm or less, still more preferably about 20 nm or less, still more preferably about 10 nm or less, still more preferably 5 nm or less, still more preferably about 4 nm or less, still more preferably about 3 nm or less, still more preferably about 2 nm or less, and most preferably about 1.5 nm or less.

In particular, in the case of a single-layer carbon nanotube, the diameter thereof is preferably about 0.4 nm or more, more preferably about 0.5 nm or more, still more preferably about 0.6 nm or more, still more preferably about 1.0 nm or more, and most preferably about 1.2 nm or more. In the case of a single-layer carbon nanotube, the diameter thereof is preferably about 5 nm or less, more preferably about 4 nm or less, still more preferably about 3 nm or less, still more preferably about 2 nm or less, and most preferably about 1.5 nm or less.

In particular, in the case of a multilayer carbon nanotube, the diameter thereof is preferably about 1 nm or more, more preferably about 2 nm or more, still more preferably about 3 nm or more, still more preferably about 4 nm or more, still more preferably about 5 nm or more, still more preferably about 10 nm or more, still more preferably about 20 nm or more, still more preferably about 30 nm or more, still more preferably about 40 nm or more, and most preferably about 60 nm or more. In the case of a multilayer carbon nanotube, the diameter thereof is preferably about 100 nm or less, more preferably about 60 nm or less, still more preferably about 40 nm or less, still more preferably about 30 nm or less, still more preferably about 20 nm or less, and most preferably about 10 nm or less. As used herein, the diameter of the multilayer nanotube refers to the diameter of the outermost carbon nanotube.

The carbon nanotube may be those having any length (i.e., length in the axial direction). The length of the carbon nanotube is preferably about 0.6 μm or more, more preferably about 1 μm or more, still more preferably about 2 μm or more, and most preferably about 3 μm or more. The length of the carbon nanotube is preferably about 1,000 μm or less, more preferably about 500 μm or less, still more preferably about 200 μm or less, still more preferably about 100 μm or less, still more preferably about 50 μm or less, still more preferably about 20 μm or less, still more preferably about 15 μm or less, still more preferably about 10 μm or less, and most preferably about 5 μm or less.

The carbon nanotube for use in the present invention may be a commercially available product or may be produced by any method known in the art. The carbon nanotubes are sold, for example, from Shenzhen Nanotech Port Co., Ltd., CARBON NANOTEHCNOLOGIES INC., SES RESEARCH, Showa Denko K.K., and the like.

Examples of the methods of producing the carbon nanotube include catalytic hydrogen reduction of carbon dioxide, arc discharge method (see e.g., C. Journet et al., Nature (London), 388 (1997), 756), a laser ablation method (see e.g., A. G. Rinzler et al., Appl. Phys. A, 1998, 67, 29), a CVD method, a gas-phase growth method, a HiPco method allowing growth of nanotube in a gas phase by reaction of carbon monoxide under high temperature and high pressure in the presence of an iron catalyst (see e.g., P. Nikolaev et al., Chem. Phys. Lett., 1999, 313, 91) and the like.

The carbon nanotube may be those unpurified or alternatively, those purified by washing, centrifugation, filtration, oxidation, chromatography, or the like. The purified carbon nanotube is preferable. The purity of the carbon nanotube to be used may be arbitrary, but is preferably about 5% or more, more preferably about 10% or more, still more preferably about 20% or more, still more preferably about 30% or more, still more preferably about 40% or more, still more preferably about 50% or more, still more preferably about 60% or more, still more preferably about 70% or more, still more preferably about 80% or more, still more preferably about 90% or more, and most preferably about 95% or more. The higher the purity of carbon nanotube, the more easily its intrinsic functions is exerted. It is noted that the purity of carbon nanotube, as used herein, refers not to the purity of a single kind of carbon nanotube having a particular molecular weight, but to the purity of the carbon nanotube as a whole. That is, when a powder of carbon nanotubes consists of 30 by weight of carbon nanotubes having a particular molecular weight A and 70% by weight of carbon nanotubes having a particular molecular weight B, the purity of the powder is 100%. Of course, the carbon nanotube to be used may be those selected for a particular diameter, a particular length, a particular structure (single layer or multilayer) or the like.

The carbon nanotube for use in the present invention may be those pulverized in a ball-type pulverizer such as ball mill, vibrating mill, sand mill and roll mill, or those shortly cut by chemical or physical treatment.

Because the carbon nanotube is superior in conductivity, even when the amount added to an aqueous composition is a relatively small amount, it gives the aqueous composition for conductive coating, which enables the formation of a transparent coating that is significantly excellent in transparency with the desired conductivity. The carbon nanotubes may be dispersed, as individually separated from each other in the aqueous composition or dispersed as bundles of multiple nanotubes. It is preferably dispersed in the state where individual nanotubes are separated from each other. Use of a conventional conductive material not in the tube shape, such as simple conductive carbon, instead of the carbon nanotube, results in decreasing of transparency of the coating formed, because the added amount thereof should be raised, compared to the carbon nanotube, in order to obtain desired conductivity. Thus, use of such a conventional conductive material is undesirable.

(5. Medium)

The term "medium", as used herein, refers to a liquid component dispersing or dissolving other substances (e.g., carbon nanotube, resin, and water-soluble xylan).

The medium used in the aqueous composition according to the present invention includes a medium that can dissolve the water-soluble xylan. The medium for use in the aqueous composition is a medium dispersing or dissolving the resin. The medium may dissolve or disperse substances other than the resin (e.g., water-soluble xylan, carbon nanotube, and the like). The medium is preferably water or any organic solvent miscible with water, and most preferably water. Examples of the organic solvents include methanol, ethanol, isopropanol, acetone, acetonitrile, propionitrile, tetrahydrofuran, 1,4-dioxane, methyl isobutyl ketone, methyl ethyl ketone, gamma-butyl lactone, propylene carbonate, sulfolane, nitromethane, N,N-dimethyl formamide, N-methyl acetamide, dimethyl sulfoxide, dimethyl sulfone, N-methyl pyrrolidone, benzene, toluene, xylene, methylene chloride, chloroform and dichloroethane.

When water is mixed with an organic solvent, the ratio of water in the entire medium is preferably about 60% by volume or more, preferably about 70% by volume or more, preferably about 80% by volume or more, preferably about 90% by volume or more, and most preferably about 95% by volume or more, of the total of volumes of water and the organic solvent before mixing. The organic solvent mixed with water may be a single kind of solvent or two or more kinds of solvents. Considering the effects on the environment and the human body, the medium is preferably water or mainly consists of water. The term "mainly consists of water" refers to that about 80% by weight or more of the medium is water. It is noted that the term "aqueous medium" is a medium in which water is the main component. The term "is the main component" refers to that the ratio of water of the entire medium is about 50% by weight or more.

(6. Other Materials)

The aqueous composition according to the present invention may further contain, as needed, various known substances such as coating-surface adjusting agents (e.g., leveling agent and antifoam), dyes, colorants, fillers, dispersants other than water-soluble xylan, lubricants, antistatic agents, plasticizers, surfactants, ultraviolet absorbents, antioxidants, storage stabilizers, adhesion aids, and thickeners, unless the substances inhibit the dispersion stability of the aqueous composition.

Any filler commonly used in emulsion type coating materials may be used as the filler. For example, silica sand, silica stone powder, diatomaceous earth, clay, talc, or the like may be used.

In the case of using filler, the blending amount of the filler is not particularly limited, but preferably 10 parts by weight or more, more preferably 30 parts by weight or more, and still more preferably 50 parts by weight or more, with respect to 100 parts by weight of the solid matter in the aqueous composition. Furthermore, the blending amount of the filler is preferably 400 parts by weight or less, more preferably 300 parts by weight or less, and still more preferably 200 parts by weight or less. If the amount added is too small, the effect of addition may be not easily obtained. If the amount added is too large, it may result in too high viscosity and easily cause difficulty in the handling.

A dispersant other than the water-soluble xylan may be added, as needed, to the composition according to the present invention. Any known dispersant may be used as the dispersant depending on the kinds of the resin and kinds of the filler. Various dispersants traditionally used in aqueous coating materials may be used preferably. Generally, a so-called surfactant may be used as the dispersant. For example, various surfactants such as anionic surfactants, cationic surfactants and nonionic surfactants are usable.

In the case where the dispersant other than the water-soluble xylan is used, the blending amount of it is not particularly limited, but preferably 0.01 part by weight or more, more preferably 0.1 part by weight or more, and more preferably 0.5 part by weight or more, with respect to 100 parts by weight of the solid matter in the aqueous composition. Furthermore, the blending amount of it is preferably 20 parts by weight or less, more preferably 10 parts by weight or less, and more preferably 5 parts by weight or less. If the amount added is too small, the aqueous composition will easily become unstable. If the amount added is too large, it may result in too low a viscosity.

(7. Method of Producing Aqueous Composition for Conductive Coating)

The aqueous composition according to the present invention can be produced by using the procedures and instruments known by those skilled in the art.

The aqueous composition according to the present invention is obtained by mixing a water-soluble xylan, a resin and a carbon nanotube in an aqueous medium.

In an embodiment, the aqueous composition according to the present invention can be produced by a method comprising mixing an aqueous solution or dispersion containing a water-soluble xylan and a carbon nanotube in an aqueous medium with an aqueous solution or dispersion containing a resin in an aqueous medium. The liquid containing a water-soluble xylan and a carbon nanotube in an aqueous medium may be an aqueous solution or dispersion. It is preferably an aqueous solution. The liquid containing a resin in an aqueous medium may be an aqueous solution or dispersion.

The aqueous composition according to the present invention can be produced, for example, by a method comprising adding a water-soluble xylan and a carbon nanotube to an aqueous medium to obtain a solution, adding a resin to an aqueous medium to obtain a dispersion, and mixing the solution with the dispersion to obtain an aqueous composition.

In one embodiment, the aqueous composition according to the present invention can be produced by a method comprising applying ultrasound to a mixture which contains a water-soluble xylan and a carbon nanotube in an aqueous medium to obtain a solution, adding a resin to an aqueous medium to obtain a dispersion, and mixing the solution with the dispersion.

For example, in a simple and easy method, water-soluble xylan and a carbon nanotube may be added to a commercially available aqueous coating material to dissolve or disperse the carbon nanotube therein.

In the step of obtaining a solution containing a water-soluble xylan and a carbon nanotube in an aqueous medium, the carbon nanotube is preferably dissolved uniformly in the solution.

One example of the method of preparing a solution in which carbon nanotubes is uniformly dissolved will be described.

A water-soluble xylan solution can be prepared by adding a water-soluble xylan to an aqueous medium. The concentration of the water-soluble xylan in the water-soluble xylan solution can be arbitrarily set, so long as the water-soluble xylan is soluble and so long as the concentration in the aqueous composition for conductive coating finally obtained is in a favorable range, considering the water contained in the aqueous dispersion or solution containing the resin, that is added in the subsequent step. Considering the water contained in the aqueous dispersion or solution of the resin, that is added in the subsequent step, setting the concentration of the water-soluble xylan in the solution so as to fall within the favorable range of the concentration of the aqueous composition for conductive coating finally obtained, is preferable from the viewpoint of the dispersion stability of the carbon nanotube. The amount of the water-soluble xylan added is those such that the concentration of the water-soluble xylan in the solution obtained preferably about 0.05% by weight or more, more preferably about 0.1% by weight or more, and still more preferably about 0.2% by weight or more. The concentration of the water-soluble xylan in the solution is preferably about 5% by weight or less, preferably about 2% by weight or less, preferably about 1.5% by weight or less, and more preferably about 0.8% by weight or less. For example, it is preferably in an amount to be in a concentration range of about 1% by weight or less. If the concentration of the water-soluble xylan is too high, the amount of the dissolved carbon nanotube may decrease. If the concentration of the water-soluble xylan is too low, the amount of the dissolved carbon nanotube may be too small.

In the case where materials other than the water-soluble xylan (e.g., other dispersants) are added, they may be added simultaneously with, or before or after, addition of the water-soluble xylan in a procedure similar to the water-soluble xylan.

Then, a carbon nanotube is added to the solution containing the water-soluble xylan, to obtain a mixture. The carbon nanotube to be added is preferably in the form of powder. The amount of the carbon nanotube to be added can be arbitrarily set, so long as it is larger than the amount of the carbon nanotube soluble by the method according to the present invention. The amount of the carbon nanotube to be added may be, for example, about 0.1 part by weight or more, about 0.2 part by weight or more, about 0.5 part by weight or more, about 1 part by weight or more, or about 5 parts by weight or more, with respect to 100 parts by weight of the solution. The amount of the carbon nanotube to be added may be, for example, about 10 parts by weight or less, about 7.5 parts by weight or less, about 5 parts by weight or less, about 3 parts by weight or less, or about 1 parts by weight or less, with respect to 100 parts by weight of the solution.

Alternatively, the water-soluble xylan and the carbon nanotube may be premixed, and then the medium be added thereto, to obtain a mixture. Alternatively, these may be mixed thoroughly by other mechanical means.

Then, the resulting mixture is applied with ultrasound to dissolve and disperse the carbon nanotube. The method applying ultrasound is not particularly limited for the conditions such as, a method applying ultrasound, frequency and time so long as it is a method which allows the uniform dissolution of the carbon nanotube in the water-soluble xylan solution. Ultrasound oscillator able to apply ultrasound includes, but is not limited to, for example, UH600 (manufactured by SMT Co. Ltd.), RUS-600 (manufactured by NIHONSEIKI KAISHA Ltd.) and the like. The temperature and pressure when applying the ultrasound are those conditions by which the solution or dispersion containing the water-soluble xylan and the carbon nanotube remains in the liquid state. For example, the solution or dispersion containing the water-soluble xylan and the carbon nanotube is placed in a glass container, and using a bath type sonicator, ultrasound is applied to it at room temperature. For example, the rated output of the ultrasound oscillator is preferably about 0.1 W/cm$^2$ or more, more preferably about 0.2 W/cm$^2$ or more, more preferably about 0.3 W/cm$^2$ or more, more preferably about 10 W/cm$^2$ or more, more preferably about 50 W/cm$^2$ or more, and most preferably about 100 W/cm$^2$ or more, per unit bottom area of the ultrasound oscillator. The rated output of the ultrasound oscillator is preferably about 1500 W/cm$^2$ or less, more preferably about 750 W/cm$^2$ or less, more preferably about 500 W/cm$^2$ or less, and most preferably about 300 W/cm$^2$ or less, per unit bottom area of the ultrasound oscillator. The oscillation frequency is preferably used in the range of 20 to 50 KHz. The amplitude is preferably about 20 μm or more, and most preferably about 30 μm or more. The amplitude is preferably about 40 μm or less. In addition, the time period applying ultrasound is preferably about 1 minute to about 3 hours, more preferably about 5 minutes to about 30 minutes. During, before or after applying ultrasound, an agitating machine such as a Voltex mixer, a homogenizer, a spiral mixer, a planetary mixer, a disperser, a hybrid mixer or the like may be used. The temperature of the mixture can be any temperature so long as, at the temperature, the substances to be dissolved does not decompose or denature and the solvent does not vapor in too much. Because the carbon nanotube is highly heat resistant, the temperature of the mixture is for example, about 5° C. or higher, preferably about 10° C. or higher, more preferably about 15° C. or higher, more preferably about 20° C. or higher, and most preferably about 25° C. or higher. The temperature of the mixture is for example about 100° C. or lower, preferably about 90° C. or lower, more preferably about 80° C. or lower, more preferably about 70° C. or lower, more preferably about 60° C. or lower, more preferably about 50° C. or lower, and most preferably about 40° C. or lower.

After application of ultrasound, the solid matters including the undissolved carbon nanotube in the solution are preferably removed by filtration, centrifugation or the like. The method of removing the undissolved solid matters from the solution after application of the ultrasound may be filtration by filter, centrifugation or the like, and is not particularly limited so long as separation between the dissolved carbon nanotube and the undissolved solid matters can be done. In the case of filtration by filter, a filter having a pore size allowing pass of the dissolved carbon nanotube but preventing pass of the undissolved solid matter is used. Preferably used is a filter having a pore size of 1 μm to about several hundreds of μm. In the case of centrifugation, a condition allowing the dissolved carbon nanotube to remain in the supernatant while allowing precipitation of the undissolved solid matter is selected. Preferably, centrifugal force equivalent to 800-4,000×g for 5-30 minutes is applied to allow separation. In this way, a solution in which the carbon nanotube is homogeneously dissolved is obtained.

In this solution, the carbon nanotube is dissolved. The phrase "the carbon nanotube is dissolved" refers to that, after the liquid containing the carbon nanotube is centrifuged at 20° C. and 2,200×g for 10 minutes, the carbon nanotube still remains distributed in the entire liquid and no reduction of coloring of liquid conferred by the carbon nanotube, precipitation or the like is observed. The carbon nanotube is dissolved almost as a single molecule in the solution.

In this solution, the carbon nanotube is dissolved stably. The phrase "the carbon nanotube is dissolved stably" refers to that, when the solution of the carbon nanotube is left to stand at room temperature (preferably at about 20° C.) for at least 3 days, no reduction of coloring of liquid conferred by the carbon nanotube, precipitation or the like is observed. Even after the solution is left to stand for preferably about 1 week, more preferably about 2 weeks, still more preferably about 3 weeks, and most preferably about 4 weeks, no reduction of coloring of liquid conferred by carbon nanotube, precipitation or the like are observed.

Homogeneous dissolution of the carbon nanotube in solution is confirmed by recovering the carbon nanotube in the carbon nanotube solution by centrifugation or the like, removing the water-soluble xylan present in excess by washing with a solvent, and then using an atomic force microscope.

The amount of the carbon nanotube dissolved or dispersed in the solution can be measured, for example, by recovering the carbon nanotube by centrifugation at 70,000×g for 15 minutes and measuring the weight thereof. Alternatively, as described in the literature "Chem. Commun.", P. 193 (2001), the concentration of the carbon nanotube has quite a high correlation with the absorbance at 500 nm, and the water-soluble xylan has almost no absorption at the wavelength. Thus, the concentration of the carbon nanotube is easily determined by measuring the absorbance of the solution at 500 nm, unless the solution contains any other substances having absorption at around 500 nm.

The concentration of the carbon nanotube in the solution can be arbitrarily set, so long as the carbon nanotube can be dissolved or dispersed. The concentration of carbon nanotube in the solution is preferably about 0.1 g/L (about 0.01% by weight) or more, more preferably about 0.5 g/L (about 0.05% by weight) or more, still more preferably about 1 g/L (about 0.1% by weight) or more, still more preferably about 2 g/L (about 0.2% by weight) or more, still more preferably about 3 g/L (about 0.3% by weight) or more, and still more preferably about 4 g/L (about 0.4% by weight) or more. There is no upper limit to the concentration of the carbon nanotube contained in the solution according to the present invention, so long as the carbon nanotube is soluble, but it is usually about 20 g/L (about 2% by weight) or less, about 10 g/L (about 1% by weight) or less, about 9 g/L (about 0.9% by weight) or less or about 8 g/L (about 0.8% by weight) or less.

To the resultant solution or dispersion in which the carbon nanotubes are homogeneously dispersed or dissolved, a resin is added and mixed to produce the aqueous composition according to the present invention. The addition of the resin can be done by usual means. For example, the resin may be added in the form of an aqueous dispersion or solution. The resin is usually added, while the solution or dispersion in which the carbon nanotubes are homogeneously dissolved or dispersed is stirred. The stirring is preferably continued after addition of the entire amount of the resin, until the resin is uniformly distributed in the aqueous composition. If materials other than the resin are added, the materials may be added at the same time with, or before or after addition of the resin in a similar procedure to the resin.

The aqueous composition obtained is centrifuged, if desired, to separate the supernatant, and then, the supernatant can be used as the aqueous composition. The aqueous composition is preferably centrifuged. In the case where centrifugation is carried out, a condition allowing the dissolved carbon nanotube and resin to remain in the supernatant while allowing precipitation of the undissolved solid matter is selected. Preferably, centrifugal force equivalent to about 800-4,000×g for about 5-30 minutes is applied to allow separation.

(8. Application of Aqueous Composition for Conductive Coating)

The aqueous composition for conductive coating according to the present invention can be used as a coating liquid as it is or mixed with other diluents.

(9. Conductive Coating)

The aqueous composition according to the present invention or a coating liquid prepared by diluting the aqueous composition according to the present invention at any ratio is applied on a substrate and dried to form a conductive coating. The conductive coating is preferably transparent. A transparent conductive coating may also be called as a conductive transparent coating-film or a conductive transparent film.

The conductive coating formed is excellent in conductivity. The conductivity of a coating is generally expressed by its surface resistivity $\rho s$ ($\Omega/\square$ or $\Omega/sq.$). The surface resistivity refers to a value obtained by dividing the potential frequency parallel with the current flowing along the surface of a test piece by the current per unit width of the surface. The surface resistivity is equivalent to the surface resistance between two electrodes which are respectively opposite side of a square having a side length of 1 cm. The surface resistivity varies according to the thickness of the test piece. The surface resistivity can be measured according to JIS K7194. In the present specification, a value measured with Rorester EP (manufactured by Mitsubishi Chemical Corporation) is used as the surface resistivity.

When the conductive coating is formed on a polyethylene terephthalate (PET) film so as to have a thickness of 1.0 μm, the surface resistivity thereof is preferably about $1.0\times10^{11}\Omega/\square$ or less, more preferably about $1.0\times10^{10}\Omega/\square$ or less, more preferably about $1.0\times10^{9}\Omega/\square$ or less, more preferably about $1.0\times10^{8}\Omega/\square$ or less, more preferably about $1.0\times10^{7}\Omega/\square$ or less, more preferably about $1.0\times10^{6}\Omega/\square$ or less, more preferably about $1.0\times10^{5}\Omega/\square$ or less, more preferably about $1.0\times10^{4}\Omega/\square$ or less, more preferably about $1.0\times10^{3}\Omega/\square$ or less, and most preferably about $1.0\times10^{2}\Omega/\square$ or less. There is no particular lower limit to the surface resistivity of the conductive coating, but it may be for example about $1.0\Omega/\square$ or more, about $5.0\Omega/\square$ or more, about $1.0\times10\Omega/\square$ or more, about $5.0\times10\Omega/\square$ or more, or the like.

In a particular embodiment, the conductive coating formed is excellent in transparency. In the present embodiment, when the conductive coating is formed on a polyethylene terephthalate (PET) film so as to have a thickness of 0.5 μm, the conductive coating has a preferable surface resistivity as described above, as well as a total light transmittance of preferably about 60% or more and a haze of about 15% or less.

The total light transmittance refers to the ratio of the total transmitted luminous flux with respect to the parallel incident luminous flux to a test piece. The total light transmittance is the ratio of the transmitted light including scattered light. The total light transmittance is a value based on JIS K 7361, which can be measured with an instrument using an integrating-sphere. In the present specification, a value measured with a haze meter NDH2000 (manufactured by Nippon Denshoku Industries Co. Ltd.) is used as the total light transmittance.

When the conductive coating formed is formed on a polyethylene terephthalate (PET) film so as to have a thickness of 0.5 μm, the total light transmittance of thereof is preferably about 60% or more, more preferably about 65% or more, more preferably about 75% or more, and most preferably about 80% or more.

The haze refers to the percentage of a transmitted light, turned by 0.044 rad (2.5°) or more from the incident light by forward scattering, based on the transmitted light passing a test piece. That is, the haze is the ratio of the scattered light with respect to the transmitted light including the scattered light, and indicates the degree of cloudiness. The haze is a value based on JIS K 7136, which can be measured with an apparatus using integrating-sphere. In the present specification, similarly to the total light transmittance, a value measured with a haze meter NDH2000 (manufactured by Nippon Denshoku Industries Co. Ltd.) is used as the haze.

When the conductive coating is formed on a polyethylene terephthalate (PET) film so as to have a thickness of 0.5 μm, the haze of thereof is preferably about 15% or less, more preferably about 10% or less, more preferably about 5% or less, and most preferably about 3% or less.

In a particular embodiment, the conductive transparent coating formed is excellent in conductivity and transparency, and achieves the following physical properties, for example, when the thickness of the conductive transparent coating formed on a PET film is 1.5 μm less: surface resistivity of $1.0\times10^{11}\Omega/\square$ or less; total light transmittance of 60% or more (preferably 70% or more); and haze of 15% or less (preferably 5% or less).

Preferably, the aforementioned physical properties are achieved when the clear coating film (transparent film), which is formed on a substrate of PET film (manufactured by Toyobo Co., Ltd., Cosmoshine A4100, total light transmittance of 90.1%, haze of 0.9, and thickness of 125 μm), is measured together with the substrate.

The strength of the conductive coating can be improved by setting the content of the resin relative to the carbon nanotube in the aqueous composition higher in the aforementioned range.

An article to be coated with the aqueous composition according to the present invention may be comprised of any materials. The material for such an article may be an inorganic or organic material, and can be selected, for example, from plastics, glass, metals, cement and the like. The article is preferably transparent. Such an article is preferably, for example, film form, plate form or the like.

EXAMPLES

Hereinafter, "part" shall mean "part by weight".

Preparative Example 1

Preparation of Aqueous Solution of Water-soluble Xylan

To 800 g of a commercially available powdery cellulose produced from wood pulp (KC Flock of Nippon Paper Chemicals Co., Ltd.) was added 20 L of water, and stirred at room temperature for 30 minutes. The solution was filtered sequentially through filter paper, 0.45 μm filter, and 0.2 μm filter, and the filtrate was recovered as a water-soluble xylan solution. As measured by a phenol sulfuric acid method, the solution obtained contained about 0.45 mg/mL of the water-soluble xylan. The solution was dried to obtain about 9 g of a xylan powder.

The molecular weight of the water-soluble xylan obtained was measured by a gel filtration/multi-angle light scattering method. Measurement was carried out by using gel filtration columns Shodex SB802 M and SB806 M at a column temperature of 40° C., an eluent of 0.1 M sodium nitrate, and a flow rate of 1 mL/min. As the detectors, a differential refractometer Shodex RI-71 (manufactured by Showa Denko K. K.) and a multi-angle light scattering detector DAWN-DSP (manufactured by Wyatt Technology Corp.) were used. The results of the measurements showed that the weight-average molecular weight of the water-soluble xylan obtained was 6,100 and the number-average molecular weight of the water-soluble xylan obtained was 7,500.

Figure 1B:
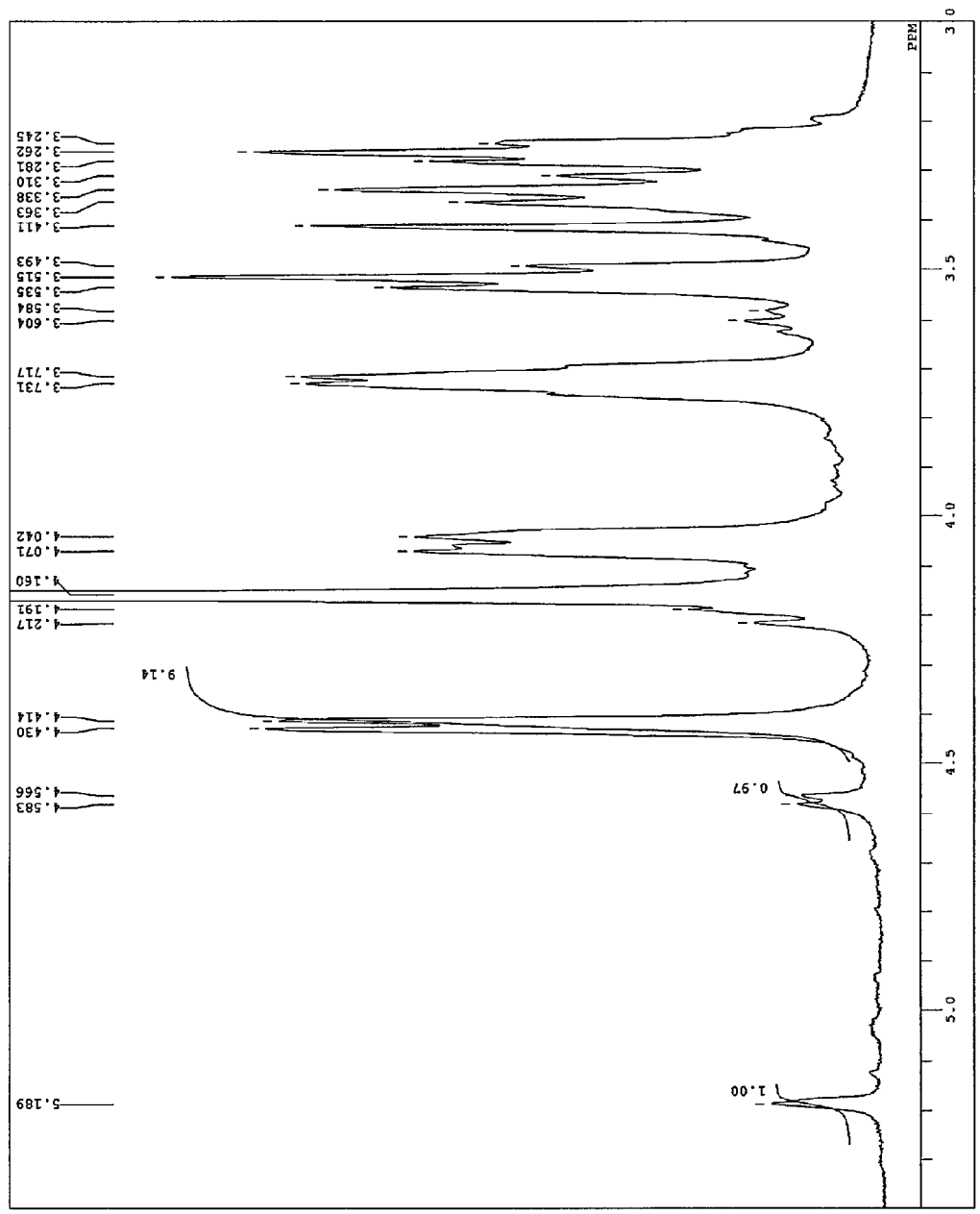
FIG. 1B is a spectral data showing the results of $^1$H-NMR analysis of a commercially available glucuronoxylan. The measuring condition for FIG. 1B was as follows: analyzer: JNM-AL400 manufactured by JOEL Ltd.; measurement frequency, 400 MHz; measurement temperature, 80° C.; and solvent, $D_2O$.

The water-soluble xylan obtained (Preparative Example 1) and a commercially available glucuronoxylan (manufactured by Institute of Chemistry, Slovak Academy of Sciences; number-average molecular weight of 18,000; xylose residues: 4-O-methyl-D-glucuronic acid residues=10:1; no acetylation; beech derived) were subjected to $^1$H-NMR analysis. In the $^1$H-NMR analysis, the sample was dissolved in heavy water at a concentration of 5.0% by weight, and measured at 80° C. Results are shown in FIGS. 1A and 1B. FIG. 1A shows the results of the water-soluble xylan obtained in Preparative Example 1, while FIG. 1B shows the results of a commercially available glucuronoxylan. The values of chemical shifts of the detected peaks of the water-soluble xylan in Preparative Example 1 are consistent with those detected with the commercially available glucuronoxylan. Thus, it was found that the water-soluble xylan contained in the commercially available powdery cellulose was a glucuronoxylan and that it was not acetylated. In FIG. 1A, the peak at around 5.2 ppm indicates the peak of the hydrogen atom bound to a carbon at the position 1 of the 4-O-methyl-D-glucuronic acid residue; the doublet peak at around 4.6 ppm indicates the peak of the hydrogen atom bound to the carbon at the position 1 of the xylose residue to which 4-O-methyl-D-glucuronic acid is bound; and the doublet peak at around 4.4 ppm indicates the peak of the hydrogen atom bound to the carbon at the position 1 of the xylose residue. Accordingly, it is possible to determine the molar ratio of the 4-O-methyl-D-glucuronic acid residue to the xylose residue constituting the water-soluble xylan, by determining (area of the peak at around 5.2 ppm): (area of the doublet peak at around 4.6 ppm)+(area of the doublet peak at around 4.4 ppm). As measured the ratio of these areas in FIG. 1A, it was found that, in the water-soluble xylan obtained from the commercially available cellulose, xylose residues: 4-O-methyl-D-glucuronic acid residues=14:1.

Further, the water-soluble xylan was hydrolyzed by heating the water-soluble xylan in 2.5 M trifluoroacetic acid at 100° C. for 6 hours, and the resulting monosaccharides were confirmed by HPLC (column: CarboPac PA-1 manufactured by Dionex; eluent: water; post-column solution: 300 mM NaOH; detector: PED-II manufactured by Dionex). As a result, almost no arabinose (0.2% or less of total saccharides) was detected. Thus, it was found that the water-soluble xylan obtained in Preparative Example 1 contained substantially no arabinose.

Experimental Example A

Example 1

Preparation of Carbon Nanotube Solution

To 95.0 parts of water were added 2.0 parts of a dispersant water-soluble xylan powder (prepared in the aforementioned Preparative Example 1) and 1.0 part of Neopelex G-65 (paste; purity of 65%; manufactured by Kao Corporation) and dissolved in a water bath at 50° C. to obtain a solution. To the solution was added 2.0 parts of L.SWNT (purity of 90% or more; single-layer carbon nanotube; diameter of 2 nm or less; length of 5 to 15 μm; manufactured by Shenzhen Nanotech Port Co., Ltd.) to obtain a mixture. The mixture was sequentially applied ultrasound by an ultrasound dispersing machine (UH600; manufactured by SMT Co. Ltd.) at an output gauge of 5 and a cooling water temperature of 10° C. for 60 minutes to dissolve the carbon nanotube and then to obtain an aqueous carbon nanotube solution.

Example 2 and Comparative Examples 1 to 4

Preparation of Carbon Nanotube Solution

In each of Example 2 and Comparative Examples 1 to 4, a carbon nanotube solution was prepared in a similar manner to Example 1, except that the kind of the dispersant was changed as described in Table 1 and the amounts of used components were changed as described in Table 1. In Comparative Examples 1, 2 and 4, no coating film for evaluation could be formed because the solubility and dispersibility of the carbon nanotube was low, aggregation of the carbon nanotubes could not be break down upon dispersion, and the carbon nanotube could not be dispersed uniformly.

(Evaluation of Dissolution Stability and Dispersion Stability)

A portion of each of the solutions immediately after preparation in Examples 1 and 2 and Comparative Examples 1 to 4 was diluted 500 times with water, and the dissolution stability and the dispersibility were evaluated by visual observation according to the following criteria:

○: No aggregation was observed;

Δ: Slight aggregation was observed, but there was no practical problem;

X: Aggregation was observed, and there were practical problems.

TABLE 1

| | Example 1 | Example 2 | Comparative Example 1 | Comparative Example 2 | Comparative Example 3 | Comparative Example 4 |
|---|---|---|---|---|---|---|
| L. SWNT (CNT; Shenzhen Nanotech Port Co., Ltd.) | 2.0 | 1.0 | 1.0 | 1.5 | 1.0 | 1.5 |
| water-soluble xylan (dispersant; Preparative Example 1) | 2.0 | 1.0 | | | | |
| Demol N (dispersant; Kao Corporation) | | | 1.0 | | 2.0 | 3.0 |
| Neopelex G-65 (dispersant; Kao Corporation) | 1.0 | | | 1.5 | 2.0 | 3.0 |
| Julimer FC-60 (dispersant; Nihon Junyaku Co., Ltd.) | | | | | 1.0 | 1.5 |
| Water | 95.0 | 98.0 | 98.0 | 97.0 | 94.0 | 91.0 |
| Total | 100.0 | 100.0 | 100.0 | 100.0 | 100.0 | 100.0 |
| Dissolution stability and dispersion stability | ○ | ○ | X | X | ○ | X |

Demol N: powder, purity of 97%; Neopelex G-65: paste, purity of 65%; and Julimer FC-60: solution, purity of 25%.

It is obvious that, in preparation of a solution by dissolving a carbon nanotube in water, use of a water-soluble xylan as dispersant allows dispersion or dissolution of the carbon nanotube at a concentration higher than those with other dispersant.

Experimental Example B

Example 3

Preparation of Aqueous Composition

While 20.0 parts of the aqueous solution prepared in Example 1 was stirred with Disper stirrer at a peripheral speed of 1.6 m/s, 67.4 parts of water was added to the aqueous solution, and then 4.4 parts of an aqueous dispersion of an acrylic type resin (NeoCryl XK-12; resin solid matter of 45%; manufacture by DSM) was added thereto.

Subsequently, 8.0 parts of ethanol and 0.2 parts of a leveling agent (BYK348; liquid, purity 100%; manufacture by BYK) were added thereto, and, after stirring for 5 minutes, the mixture was centrifuged in a centrifuge (H-200E; manufactured by Kokusan Co., Ltd.) at 800 g for 5 minutes, to obtain the supernatant. The supernatant was used as an aqueous composition. It is noted that the centrifugation was carried out for the removal of, for example, the contaminants that are mixed in the mixture (i.e., coating material) after addition of ethanol and the leveling agent and the aggregates formed by the shock during coating material preparation and for improvement in appearance, such as haze and transparency, of the coating film formed by coating as much as possible. The precipitates were scarcely formed by centrifugation, and the amount of it was unmeasurable. Accordingly, the content of each component contained in the aqueous composition is considered to be almost the same as the blending amount.

Examples 4 to 6 and Comparative Example 5

Preparation of Aqueous Composition

In each of Examples 4 to 6 and Comparative Example 5, an aqueous composition was prepared in a similar manner to Example 3, except that the kind of the dispersion was changed as described in Table 2 and the amounts of used components were changed as described in Table 2. Also in these Examples and Comparative Example, almost no precipitates were generated by centrifugation, and the amount thereof was unmeasurable. Accordingly, the content of each component contained in the aqueous composition is considered to be almost the same as the blending amount.

(Evaluation of Dispersion Stability, Surface Resistivity, Total Light Transmittance and Haze)

Dispersion Stability

A portion of each of the aqueous compositions immediately after preparation in Examples 3 to 6 and Comparative Example 5 was diluted by 500 times with water, and the dispersibility was evaluated by visual observation according to the following criteria:

○: No aggregation was observed;

Δ: Slight aggregation was observed, but there was no practical problem;

X: Aggregation was observed, and there were practical problems.

The aqueous composition immediately after preparation was coated on a PET film (manufacture by Toyobo Co., Ltd.; 125 μm film) by using a bar coater No. 3 and dried by being heated at 100° C. for 60 seconds, to obtain a coating. The coating was evaluated for the following evaluation items. It is noted that the total light transmittance of the PET film alone was 90.1%, and the haze was 0.9.

Surface Resistivity

The surface resistivity was measured with Rorester EP (manufactured by Mitsubishi Chemical Corporation).

Total Light Transmittance and Haze

The total light transmittance and the haze were measured with a haze meter NDH2000 (manufactured by Nippon Denshoku Industries Co. Ltd.).

The results of the evaluation are shown in Table 2, together with the film thickness. The film thickness is a value calculated based on the following Formula:

$$t = m \times \left(\frac{1}{dt} - \frac{ws}{100 ds}\right) \quad \text{[Formula 1]}$$

t: Theoretical dry film thickness (μm)
m: Coating amount per unit area (g/m$^2$)
dt: Specific gravity of coating material (g/cm$^3$)
ds: Specific gravity of volatile matter (g/cm$^3$)
ws: Weight ratio of volatile matter (%)

a cooling water temperature of 10° C. for 30 minutes to dissolve the carbon nanotube. While the aqueous solution was stirred with Disper stirrer at a peripheral speed of 1.6 m/s, 13.4 parts of an aqueous dispersion of a polyester type resin (Vilonal MD1245; manufacture by Toyobo Co., Ltd.) was added to the aqueous solution. Subsequently, 8.0 parts of ethanol and 0.2 parts of a leveling agent (BYK348; manufacture by BYK-Chemie) were added thereto, and after stirring additionally for 5 minutes, the mixture was centrifuged in a centrifuge (H-200E; manufactured by Kokusan Co. Ltd.) at 800×g for 5 minutes, to obtain the supernatant. The supernatant was used as an aqueous composition. It is noted that the centrifugation was carried out for the removal of, for example, the contaminants that are mixed in the mixture (i.e., coating material) after the addition of ethanol and the leveling agent and the aggregates formed by the shock during coating material preparation and for improvement in appearance, such as haze and transparency, of the coating film formed by coating as much as possible. The precipitates were scarcely formed by centrifugation, and the amount of it was unmea-

TABLE 2

|  | Example 3 | Example 4 | Example 5 | Example 6 | Comparative Example 5 |
|---|---|---|---|---|---|
| Solution of Example 1 | 20.0 | 40.0 | 75.0 |  |  |
| Solution of Example 2 |  |  |  | 80.0 |  |
| Dispersion of Comparative Example 3 |  |  |  |  | 80.0 |
| NeoCryl XK-12 (acrylic type resin: DSM) | 4.4 | 8.9 | 16.8 | 8.9 | 8.9 |
| BYK348 (leveling agent: BYK) | 0.2 | 0.2 | 0.2 | 0.2 | 0.2 |
| Ethanol | 8.0 | 8.0 | 8.0 | 8.0 | 8.0 |
| Water | 67.4 | 42.9 |  | 2.9 | 2.9 |
| Total | 100.0 | 100.0 | 100.0 | 100.0 | 100.0 |
| Dispersion stability | ○ | ○ | ○ | ○ | ○ |
| CNT concentration in the aqueous composition (% by weight) | 0.4 | 0.8 | 1.5 | 0.8 | 0.8 |
| CNT/resin solid matter (weight ratio) | 1/5 | 1/5 | 1/5 | 1/5 | 1/5 |
| Total solid matter (% by weight) | 2.8 | 5.6 | 10.5 | 5.6 | 6.8 |
| Coating thickness | 193 nm | 386 nm | 724 nm | 386 nm | 469 nm |
| Surface resistivity (Ω/□) | $4.1 \times 10^7$ | $3.3 \times 10^6$ | $3.8 \times 10^4$ | $2.0 \times 10^6$ | $5.6 \times 10^6$ |
| Total light transmittance (%) | 86.0 | 82.3 | 67.1 | 81.5 | 82.8 |
| Haze | 2.0 | 2.0 | 5.8 | 1.9 | 2.5 |

Experimental Example C

Example 7

Preparation of Aqueous Composition

To a solution in which 0.4 parts of a water-soluble xylan powder (prepared in Preparative Example 1) was dissolved in 77.6 parts of water, was added 0.4 parts of $C_{Tube}100$ (purity of 93% or more; multilayer carbon nanotube; diameter of 10 to 50 nm; length of 0.5 to 100 μm; manufacture by CNT) to obtain a mixture. The mixture was sequentially applied with ultrasound using an ultrasound dispersing machine (UH600; manufactured by SMT Co. Ltd.) at an output gauge of 5 and surable. Accordingly, the content of each component contained in the aqueous composition is considered to be almost the same as the blending amount.

Examples 8 to 10

Preparation of Aqueous Composition

In each of Examples 8 to 10, an aqueous composition was prepared in a similar manner to Example 7, except that the resin was changed as described in Table 3 and the amounts of used components were changed as described in Table 3.

(Evaluation of Dispersion Stability, Surface Resistance, Total Light Transmittance, Haze, and Peeling Property)

Dispersion Stability, Surface Resistance, Total Light Transmittance, and Haze

A coating was formed on a PET film in a manner similar to the method of forming a coating by the evaluation method of Experimental Example B. The dispersion stability of the aqueous composition, as well as surface resistance, total light transmittance and haze of the coating were measured by methods similar to those described in Experimental Example B.

Strength of Coating Film

As for the strength of the coating film, abrasion was carried out 100 times using a friction tester (manufactured by Suga Test Instruments Co., Ltd.) with a cotton cloth No. 3 under a load of 200 g and then the coating film was evaluated by visual observation, and the surface resistance after the abrasion was measured.

[Evaluation Criteria for Visual Observation]

◯: Coating surface was damaged, but there was no peeling;

Δ: Less than 10% of coating was peeled; and

X: 100 or more of coating was peeled.

It is clear that, although decrease in the ratio of resin solid matter to carbon nanotube leads to the decrease in coating strength, the effects of the present invention (excellent transparency and conductivity) can be obtained.

Experimental Example D

Example 11 and Comparative Examples 6 to 8

Preparation of Aqueous Composition

In each of Example 11 and Comparative Examples 6 to 8, an aqueous composition was prepared in a similar manner to Example 7, except that the kinds of the dispersant and resin were changed as described in Table 4 and the application time of ultrasound was changed as described in Table 5.

(Evaluation)

A coating was formed on a PET film in a manner similar to the method of forming a coating by the evaluation method of Experimental Example B. The dispersivility of the aqueous composition, as well as surface resistance, total light transmittance and haze of the coating were measured by methods similar to those described in Experimental Example B.

TABLE 3

|  | Example 7 | Example 8 | Example 9 | Example 10 |
|---|---|---|---|---|
| $C_{Tube}100$(CNT) | 0.4 | 0.4 | 0.4 | 0.4 |
| Water-soluble xylan | 0.4 | 0.4 | 0.4 | 0.2 |
| Vylonal MD1245 (polyester type resin: Toyobo Co., Ltd.) | 13.4 | 6.6 | 20.0 | — |
| Burnock WE-307 (acrylic type resin: Dainippon Ink and Chemicals, Inc.) | — | — | — | 5.9 |
| Burnock DNW-5000 (isocyanate type resin: Dainippon Ink and Chemicals, Inc.) | — | — | — | 1.9 |
| BYK348 | 0.2 | 0.2 | 0.2 | 0.2 |
| Ethanol | 8.0 | 8.0 | 8.0 | 8.0 |
| Water | 77.6 | 84.4 | 71.0 | 83.4 |
| Total | 100.0 | 100.0 | 100.0 | 100.0 |
| Dispersion stability | ◯ | ◯ | ◯ | ◯ |
| CNT/resin solid matter (weight ratio) | 1/10 | 1/5 | 1/15 | 1/10 |
| Total solid matter (% by weight) | 4.8 | 2.8 | 6.8 | 4.8 |
| Coating thickness | 331 nm | 193 nm | 469 nm | 331 nm |
| Surface resistivity ($\Omega/\square$) | $9.5 \times 10^6$ | $4.5 \times 10^6$ | $7.8 \times 10^7$ | $5.8 \times 10^6$ |
| Total light transmittance (%) | 79.9 | 79.5 | 80.1 | 80.1 |
| Haze | 2.0 | 2.2 | 1.8 | 2.0 |
| Strength of the coating film — evaluation by visual observation | ◯ | ◯ | ◯ | ◯ |
| Strength of the coating film — Surface resistance | $1.3 \times 10^7$ | $6.8 \times 10^6$ | $1.0 \times 10^7$ | $7.8 \times 10^6$ |

Vylonal MD1245: aqueous dispersion, resin solid matter of 30%; Burnock WE-307: aqueous dispersion, resin solid matter of 45%; and Burnock DNW-5000: solution, resin solid matter of 80%.

TABLE 4

|  | Example 11 | Comparative Example 6 | Comparative Example 7 | Comparative Example 8 |
|---|---|---|---|---|
| $C_{Tube}100$ | 0.4 | 0.4 | 0.4 | 0.4 |
| Water-soluble Xylan | 0.4 | — | — | — |
| Demol N | — | 0.4 | — | — |
| Neopelex G-65 | — | — | 0.4 | — |
| Johncryl 60 (dispersant: Johnson Polymer Co., Ltd.) | — | — | — | 1.2 |
| Hydran HW171 (urethane type resin: Dainippon Ink and Chemicals, Inc.) | 11.4 | 11.4 | 11.4 | 11.4 |
| BYK348 | 0.2 | 0.2 | 0.2 | 0.2 |
| Ethanol | 8.0 | 8.0 | 8.0 | 8.0 |
| Water | 79.6 | 79.6 | 79.6 | 78.8 |
| Total | 100.0 | 100.0 | 100.0 | 100.0 |
| Dispersion stability | ◯ | ◯ | ◯ | ◯ |
| CNT/resin solid matter | 1/10 | 1/10 | 1/10 | 1/10 |
| Coating thickness | 331 nm | 331 nm | 331 nm | 331 nm |

Johncryl 60: solution, purity of 34%; and Hydran HW171: aqueous dispersion, purity of 35%.

TABLE 5

| | Example 11 | | | | Comparative Example 6 | | | |
|---|---|---|---|---|---|---|---|---|
| Time of Ultrasound | Dispersion stability | Surface resistivity (Ω/□) | Total light transmittance (%) | Haze | Dispersion stability | Surface resistivity (Ω/□) | Total light transmitance (%) | Haze |
| 30 minutes | ○ | $1.1 \times 10^7$ | 80.2 | 1.9 | X | — | — | — |
| 50 minutes | ○ | $1.0 \times 10^7$ | 79.9 | 2.0 | X | — | — | — |
| 70 minutes | ○ | $1.1 \times 10^7$ | 80.5 | 1.8 | ○ | $1.0 \times 10^7$ | 80.8 | 2.2 |
| 90 minutes | ○ | $2.1 \times 10^7$ | 80.1 | 2.0 | ○ | $3.0 \times 10^7$ | 80.9 | 2.3 |

| | Comparative Example 7 | | | | Comparative Example 8 | | | |
|---|---|---|---|---|---|---|---|---|
| Time of Ultrasound | Dispersion stability | Surface resistivity (Ω/□) | Total light transmittance (%) | Haze | Dispersion stability | Surface resistivity (Ω/□) | Total light transmitance (%) | Haze |
| 30 minutes | X | — | — | — | X | — | — | — |
| 50 minutes | X | — | — | — | X | — | — | — |
| 70 minutes | ○ | $4.0 \times 10^7$ | 78.8 | 2.5 | ○ | $1.4 \times 10^9$ | 79.9 | 2.3 |
| 90 minutes | ○ | $7.4 \times 10^7$ | 79.3 | 2.2 | ○ | $3.7 \times 10^9$ | 79.4 | 2.6 |

Use of the water-soluble xylan gives excellent dispersivility than other dispersants, and can shorten the time required for the dispersion, and thus can improve the productivity.

Experimental Example E

Storage Test

The aqueous composition obtained in Example 3 immediately after preparation was transferred into a tightly sealed container and stored in the environment of a temperature of 23° C. and a humidity of 50%; for 1, 2, and 4 weeks.
(Evaluation of Dispersion Stability, Surface Resistivity, Total Light Transmittance and Haze)
Dispersion Stability
The dispersion stability of the aqueous composition was evaluated in a similar manner to the dispersion stability in Experimental Example B, except that it was evaluated after storage.
Surface Resistivity, Total Light Transmittance and Haze
A coating was formed on a PET film in a similar manner to the method of forming a coating in the evaluation method of Experimental Example B, except that the aqueous composition after storage was used. The surface resistivity, total light transmittance and haze of the coating were measured in similar manners to Experimental Example B.

TABLE 6

| | Example 3 | | |
|---|---|---|---|
| | Immediately after preparation | 2 weeks later | 4 weeks later |
| Surface resistivity (Ω/□) | $4.1 \times 10^7$ | $4.8 \times 10^7$ | $5.0 \times 10^7$ |
| Total light transmittance (%) | 86.0 | 85.8 | 86.1 |
| Haze | 2.0 | 2.2 | 2.0 |
| Dispersion stability | ○ | ○ | ○ |

It is clear that no deterioration in dispersion stability, conductivity or transparency over time was observed. Therefore, the aqueous composition for conductive coating according to the present invention is very useful commercially.
As described above, the present invention has been exemplified using a preferred embodiment of the present invention, but the present invention should not be construed to be limited to this embodiment. It is understood that the present invention should be construed for its scope only by the claims. It is understood that those skilled in the art can practice an equivalent range based on the description of the invention and the technical common knowledge, from the description of the specific preferable embodiment of the present invention. It is understood that patents, patent applications and publications cited in the present specification are herein incorporated by reference for the content thereof as if the contents themselves were specifically described in the present specification.

INDUSTRIAL APPLICABILITY

The aqueous composition for conductive coating according to the present invention is suitable as a coating material for forming a conductive transparent coating (conductive transparent film) useful in the field of electronic parts and also as an antistatic material in clean rooms.

The invention claimed is:

1. An aqueous composition for conductive coating, comprising a water-soluble xylan, a resin and a carbon nanotube in an aqueous medium,
wherein the carbon nanotube is dissolved or dispersed, and
wherein said water-soluble xylan is a molecule having six or more xylose residues connected to each other with β-1, 4 bonds and dissolves in water at 20° C. at a concentration of at least 6 mg/mL, wherein said water-soluble xylan consists of:
an unmodified xylose residue or unmodified acetylated xylose residue; and
a 4-O-methyl glucuronic acid residue.

2. The aqueous composition according to claim 1, wherein said carbon nanotube is a multilayer carbon nanotube.

3. The aqueous composition according to claim 1, wherein said carbon nanotube is a single-layer carbon nanotube.

4. The aqueous composition according to claim 1, wherein the number-average degree of polymerization of the main chain of said water-soluble xylan is 6 or more and 5,000 or less.

5. The aqueous composition according to claim 1, wherein in said water-soluble xylan, the ratio of the total of the unmodified xylose residue and unmodified acetylated xylose residue per the 4—O-methyl glucuronic acid residue is 1 to 20.

6. The aqueous composition according to claim 1, wherein the number-average molecular weight of said water-soluble xylan is 7,000 or more and 1,000,000 or less.

7. The aqueous composition according to claim 1, wherein said water-soluble xylan is derived from woody plants.

8. The aqueous composition according to claim 5, wherein said water-soluble xylan is derived from broad-leaved trees.

9. The aqueous composition according to claim 1, wherein said aqueous medium is water.

10. The aqueous composition according to claim 8, wherein the concentration of the carbon nanotube is 50 mg/L or more.

11. The aqueous composition according to claim 8, wherein the concentration of the carbon nanotube is 1 g/L or more.

12. The aqueous composition according to claim 1, wherein the carbon nanotube is dissolved.

13. The aqueous composition according to claim 1, wherein the carbon nanotube is dissolved uniformly.

14. The aqueous composition according to claim 1, wherein the carbon nanotube is dissolved stably.

15. The aqueous composition according to claim 1, wherein the content of the water-soluble xylan in the aqueous composition is about 0.05% by weight or more and about 05% by weight or less.

16. The aqueous composition according to claim 1, wherein the content of the carbon nanotube in the aqueous composition is about 0.05% by weight or more and about 10.0% by weight or less.

* * * * *